(12) United States Patent
Ogawa

(10) Patent No.: US 10,317,871 B2
(45) Date of Patent: Jun. 11, 2019

(54) MACHINE TOOL SYSTEM AND OPENING STOP POSITION CALCULATING DEVICE

(71) Applicant: FANUC CORPORATION, Yamanashi (JP)

(72) Inventor: Yoshitsugu Ogawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 52 days.

(21) Appl. No.: 15/459,102

(22) Filed: Mar. 15, 2017

(65) Prior Publication Data

US 2017/0269569 A1    Sep. 21, 2017

(30) Foreign Application Priority Data

Mar. 17, 2016  (JP) ................................. 2016-054425

(51) Int. Cl.
*G05B 19/4063*    (2006.01)
*G05B 19/19*       (2006.01)
(Continued)

(52) U.S. Cl.
CPC ............... *G05B 19/19* (2013.01); *B23Q 7/04* (2013.01); *B23Q 11/0825* (2013.01);
(Continued)

(58) Field of Classification Search
CPC .......... E05Y 2400/36; E05Y 2900/132; E05Y 2800/00; E05Y 2400/32; E05Y 2400/354;
(Continued)

(56) References Cited

U.S. PATENT DOCUMENTS 4,999,551 A * 3/1991 Yoshida ................ B66B 13/143
318/286
5,155,423 A * 10/1992 Karlen ...................... B25J 9/04
318/568.1
(Continued)

FOREIGN PATENT DOCUMENTS

JP            61110212 A     5/1986
JP             642257 A      2/1994
(Continued)

OTHER PUBLICATIONS

English Abstract and Machine Translation for Japanese Publication No. 2010-228063 A, published Oct. 14, 2010, 7 pgs.
(Continued)

*Primary Examiner* — Darrin D Dunn
(74) *Attorney, Agent, or Firm* — Fredrikson & Byron, P.A.

(57) ABSTRACT

A machine tool system and an opening stop position calculating device are provided. The machine tool system includes an openable and closable door for closing an opening of a cover surrounding a machine tool. Furthermore, the machine tool system includes an opening width setting unit for setting an opening width of the door, an opening stop position calculating unit for calculating an opening stop position of the door at which a total time, which is obtained by summing a time required to move the door from a fully closed position to a position of the set opening width and a time required to move the door from an opening stop position where the door is opened and stopped to the fully closed position, is minimized, and a door control unit for controlling opening and closing of the door based on the calculated opening stop position when exchanging the workpiece.

11 Claims, 13 Drawing Sheets

(51) Int. Cl.
*B23Q 7/04* (2006.01)
*B23Q 11/08* (2006.01)
*G05B 19/416* (2006.01)
*B23Q 17/00* (2006.01)

(52) U.S. Cl.
CPC ........ *B23Q 11/0891* (2013.01); *B23Q 17/007* (2013.01); *G05B 19/416* (2013.01); *G05B 2219/36262* (2013.01); *G05B 2219/37347* (2013.01); *G05B 2219/45242* (2013.01); *G05B 2219/50246* (2013.01)

(58) Field of Classification Search
CPC ......... E05Y 2900/104; E05Y 2900/531; E05Y 2400/45; G05B 2219/45242; G05B 19/19; G05B 19/416; G05B 2219/36262; G05B 19/4061; B23Q 17/007; H01L 21/67167; H01L 21/67772; Y02P 90/087; Y02P 90/12
See application file for complete search history.

(56) References Cited

U.S. PATENT DOCUMENTS

| | | | | |
|---|---|---|---|---|
| 5,278,480 | A * | 1/1994 | Murray | G05B 19/42 318/266 |
| 5,286,160 | A * | 2/1994 | Akeel | B05B 13/0292 118/326 |
| 5,378,861 | A * | 1/1995 | Barten | G05D 3/00 187/316 |
| 5,760,350 | A * | 6/1998 | Pepin | B66B 13/143 187/316 |
| 5,864,104 | A * | 1/1999 | Tawada | B66B 13/146 187/316 |
| 6,297,611 | B1 * | 10/2001 | Todorov | B25J 9/042 318/567 |
| 6,466,838 | B1 * | 10/2002 | Aoki | G03F 7/70691 700/121 |
| 6,748,998 | B2 * | 6/2004 | Yamagami | B23Q 5/34 160/117 |
| 7,992,687 | B2 * | 8/2011 | Yumura | B66B 13/26 187/316 |
| 8,169,169 | B2 * | 5/2012 | Hass | E05F 15/63 318/257 |
| 8,308,419 | B2 * | 11/2012 | Nihei | B25J 9/047 414/680 |
| 8,729,837 | B2 * | 5/2014 | Tandrow | G05B 19/19 318/268 |
| 9,520,309 | B2 * | 12/2016 | Hiroki | H01L 21/67167 |
| 9,567,790 | B2 * | 2/2017 | Yamada | E05F 15/659 |
| 9,951,548 | B2 * | 4/2018 | Oda | E05F 15/60 |
| 2002/0045957 | A1 * | 4/2002 | Otsuki | G05B 19/416 700/63 |
| 2004/0086364 | A1 * | 5/2004 | Watanabe | B25J 9/0084 414/416.01 |
| 2006/0108960 | A1 * | 5/2006 | Tanaka | B25J 9/1676 318/568.21 |
| 2008/0084300 | A1 * | 4/2008 | Albers | E05F 15/73 340/545.1 |
| 2008/0178422 | A1 * | 7/2008 | Imai | E05F 15/632 16/57 |
| 2008/0275593 | A1 * | 11/2008 | Johansson | B29C 45/7626 700/245 |
| 2009/0072631 | A1 * | 3/2009 | Iida | B25J 19/06 307/326 |
| 2009/0204260 | A1 * | 8/2009 | Bryne | B05B 13/0292 700/259 |
| 2010/0028117 | A1 * | 2/2010 | Nihei | B25J 9/0009 414/728 |
| 2010/0030381 | A1 * | 2/2010 | Clifford | B05B 13/0292 700/258 |
| 2012/0041593 | A1 * | 2/2012 | Ichinose | B66B 1/2458 700/258 |
| 2012/0165984 | A1 * | 6/2012 | Kang | B25J 5/00 700/259 |
| 2013/0034660 | A1 * | 2/2013 | Koyanagi | B05B 13/0292 427/424 |
| 2013/0203572 | A1 * | 8/2013 | Denkmeier | B21D 5/0254 483/58 |
| 2013/0234844 | A1 * | 9/2013 | Yopp | B60Q 9/008 340/435 |
| 2014/0156068 | A1 * | 6/2014 | Graca | B25J 9/1666 700/248 |
| 2015/0308176 | A1 * | 10/2015 | Oda | E05F 15/40 49/31 |
| 2015/0308177 | A1 * | 10/2015 | Oda | E05F 15/41 49/31 |
| 2015/0362940 | A1 * | 12/2015 | Lamb | H02J 13/0086 700/297 |
| 2016/0155653 | A1 * | 6/2016 | Pomerleau | H01L 21/67201 137/12 |
| 2016/0260628 | A1 * | 9/2016 | Ochiai | H01L 21/67772 |
| 2016/0307783 | A1 * | 10/2016 | Iida | H01L 21/67167 |
| 2017/0234054 | A1 * | 8/2017 | Kumar | E05F 15/40 49/324 |
| 2017/0269569 | A1 * | 9/2017 | Ogawa | B23Q 7/04 |
| 2017/0284146 | A1 * | 10/2017 | Maki | E05F 15/632 |
| 2017/0328108 | A1 * | 11/2017 | Long | G01L 3/242 |

FOREIGN PATENT DOCUMENTS

| | | |
|---|---|---|
| JP | 7244520 A | 9/1995 |
| JP | 1199435 A | 4/1999 |
| JP | 2010228063 A | 10/2010 |
| JP | 4629392 B2 | 11/2010 |
| JP | 2014205231 A | 10/2014 |
| JP | 2015209658 A | 11/2015 |

OTHER PUBLICATIONS

English Abstract (JP 2006-075916 A) and Machine Translation for Japanese Publication No. 4629392 B2, published Nov. 19, 2010, 8 pgs.
English Abstract and Machine Translation for Japanese Publication No. 2015-209658 A, published Nov. 24, 2015, 7 pgs.
English Abstract and Machine Translation for Japanese Publication No. 2014-205231 A, published Oct. 30, 2014, 9 pgs.
English Abstract and Machine Translation for Japanese Publication No. 11-099435 A, published Apr. 13, 1999, 9 pgs.
English Abstract and Machine Translation for Japanese Publication No. 07-244520 A, published Sep. 19, 1995, 9 pgs.
English Abstract and Machine Translation for Japanese Publication No. 06-042257 A, published Feb. 15, 1994, 9 pgs.
English Abstract and Machine Translation for Japanese Publication No. 61-110212 A, published May 28, 1986, 9 pgs.
Untranslated Decision to Grant issued by Japan Patent Office for JP Application No. 2016-054425, dated Mar. 1, 2018, 3 pages.
English Machine Translation of Decision to Grant issued by Japan Patent Office for JP Application No. 2016-054425, dated Mar. 1, 2018, 3 pages.

* cited by examiner

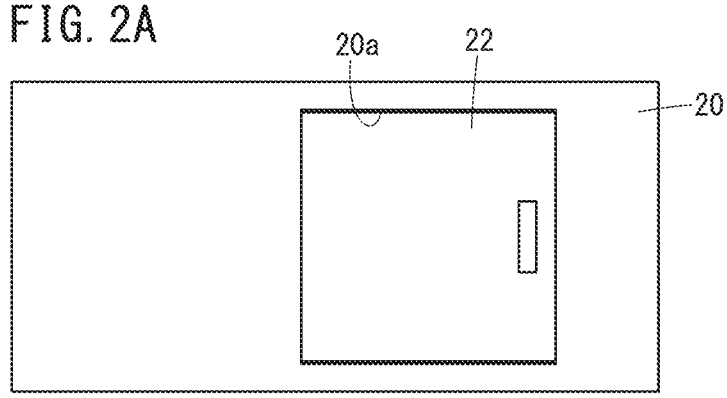
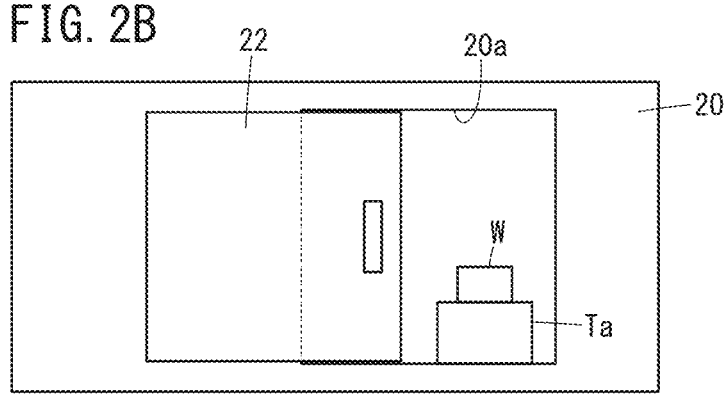
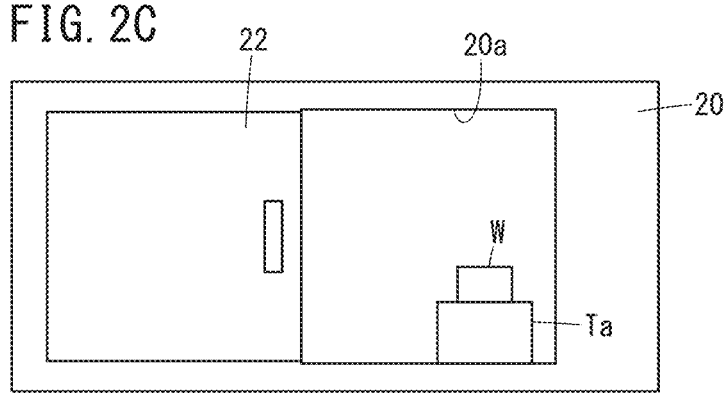

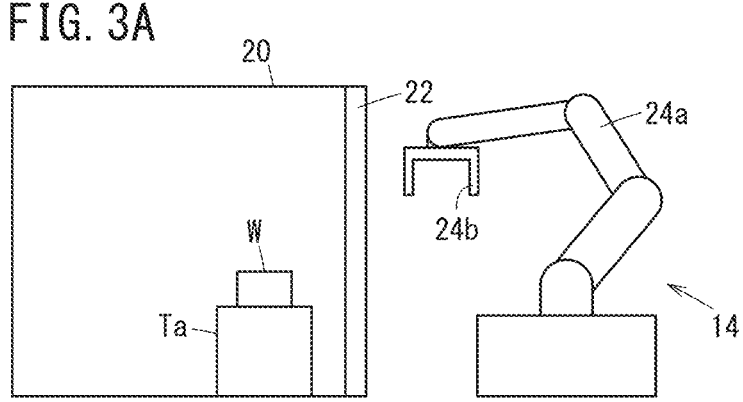
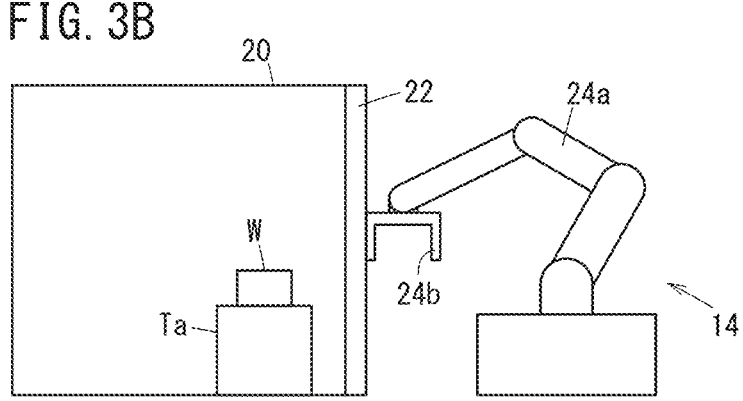
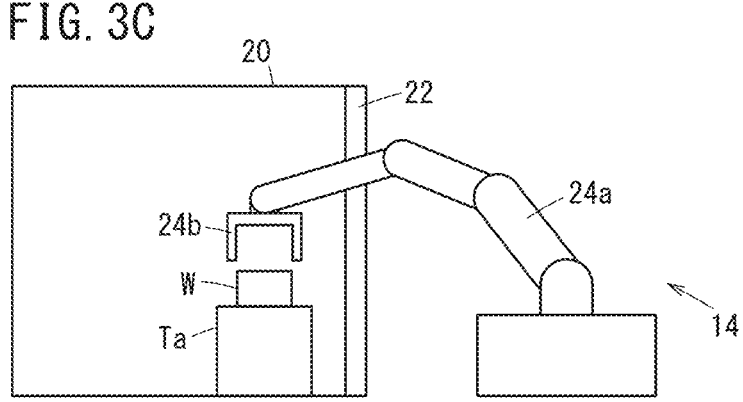

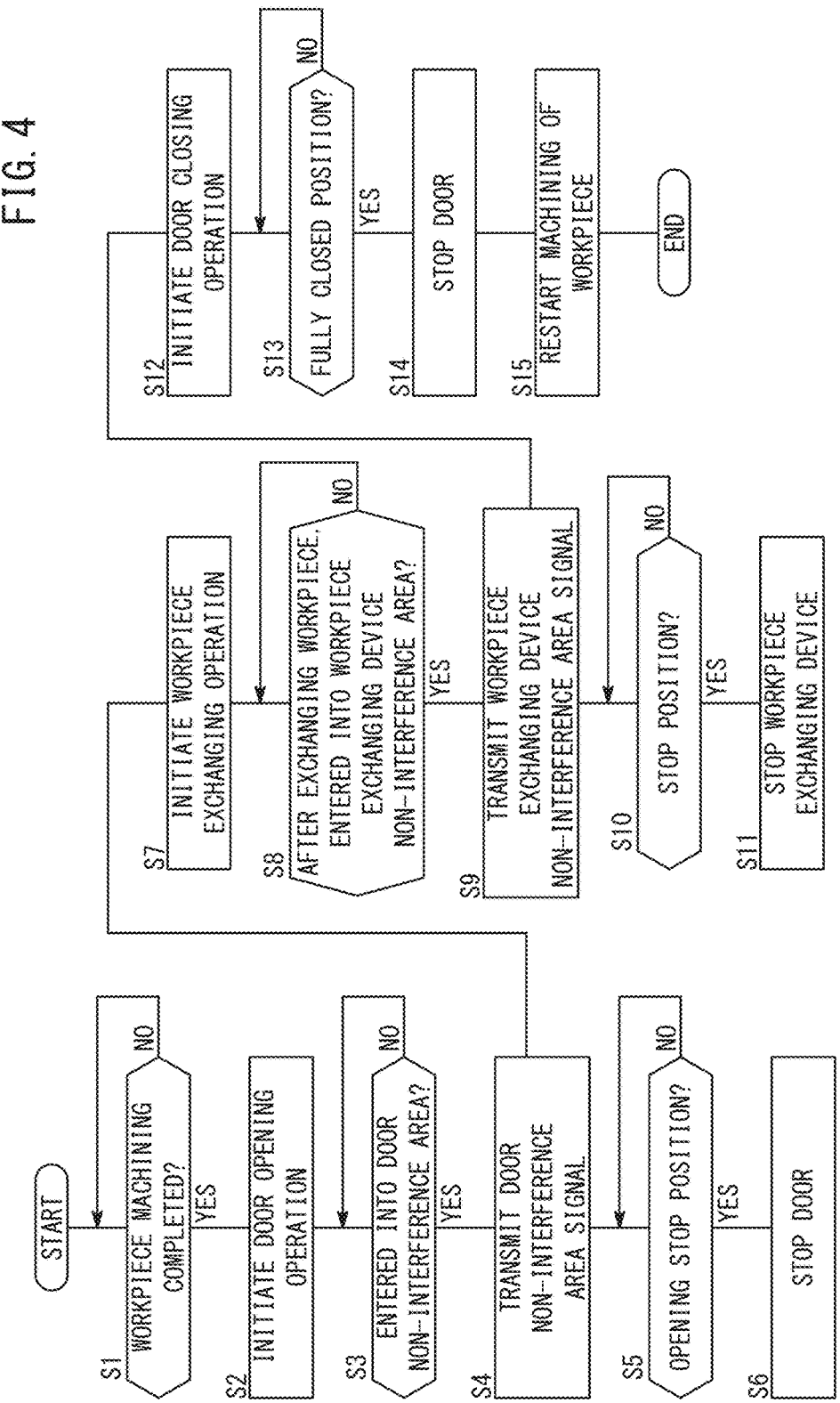

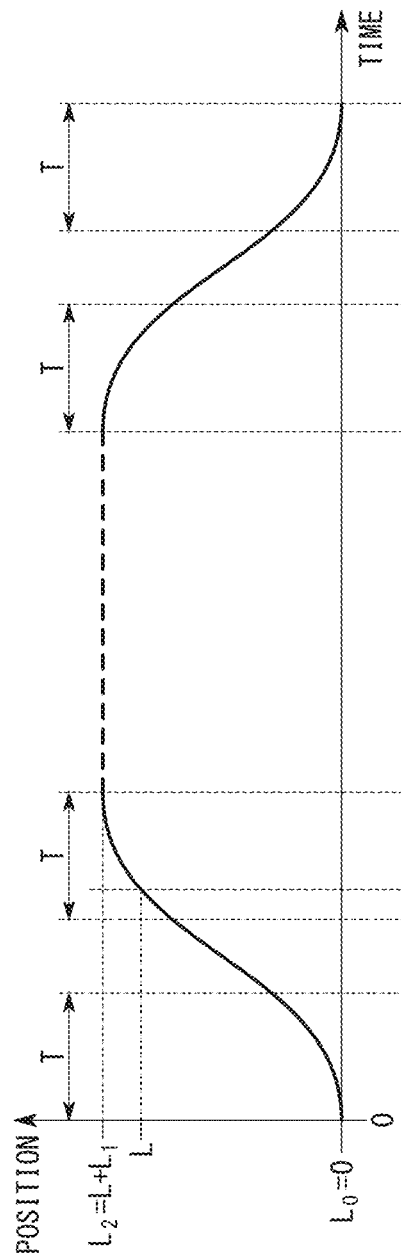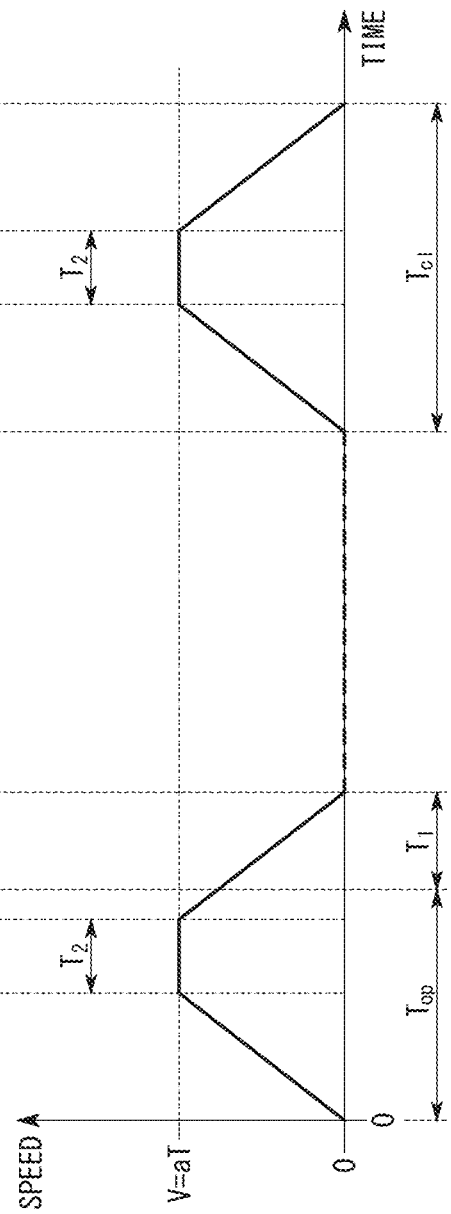

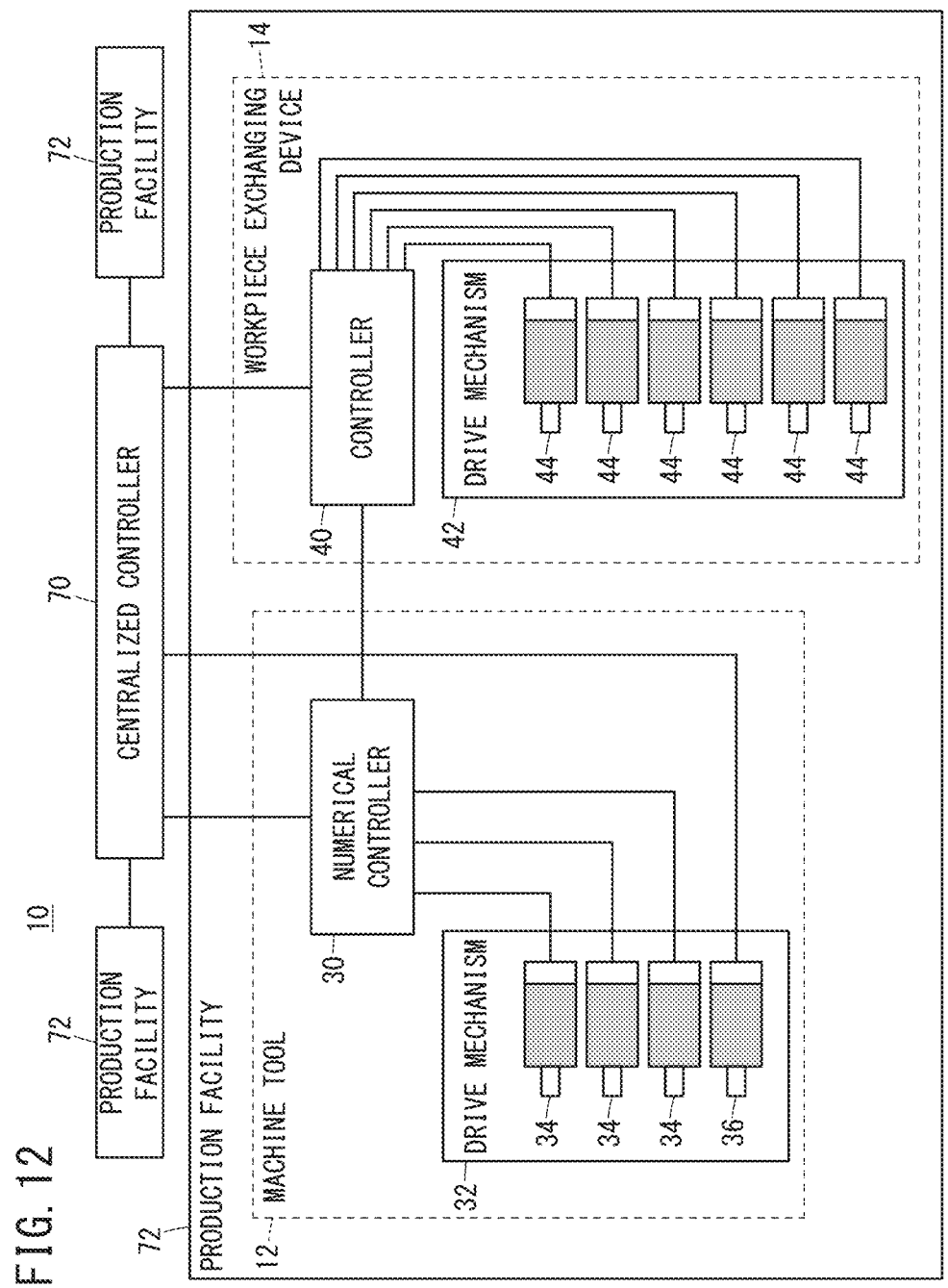

MACHINE TOOL SYSTEM AND OPENING STOP POSITION CALCULATING DEVICE

CROSS-REFERENCE TO RELATED APPLICATION

This application is based upon and claims the benefit of priority from Japanese Patent Application No. 2016-054425 filed on Mar. 17, 2016, the contents of which are incorporated herein by reference.

BACKGROUND OF THE INVENTION

Field of the Invention

The present invention relates to a machine tool system and an opening stop position calculating device for calculating an opening stop position of a door that is opened for exchanging a workpiece of a machine tool.

Description of the Related Art

In order to manufacture workpieces at lower cost, automation and high speed operations for manufacturing have been sought. As one part thereof, an existing automation system for automating machining that is performed by using a machine tool is known. In such an automation system, not only machining itself, but exchange of workpieces (loading of non-machined workpieces and unloading of machined workpieces) is performed automatically. Exchange of the workpiece is carried out by a workpiece exchanging device. Further, when machining is carried out, it is necessary to close the door in order to prevent scattering of chips and cutting fluid, whereas when exchanging the workpiece, it is necessary to open the door so that the workpiece exchanging device can be moved inside the machine tool, and opening and closing of the door is carried out also automatically. Although a fluid pressure cylinder using hydraulic pressure or air may be used as a drive source for opening and closing the door, in this case, since it is difficult to control the position and speed of the door, it also is difficult to lower the speed immediately before the stop position of the door, and to accurately stop the door at an arbitrary position.

In Japanese Patent No. 4629392, opening and closing of a door at high speed by using a servomotor and a ball screw is disclosed. Because the door can be decelerated by the servomotor in the vicinity of an opening/closing terminus thereof even if the door is moved at a high speed, and because the door can be stopped at an arbitrary position, shocks at the opening/closing terminus can be reduced, and further, by opening the door only at a required width, it is possible to carry out opening and closing of the door at a higher speed. Consequently, the time required to open and close the door is shortened, and the cycle time can be made shorter as well.

Japanese Laid-Open Patent Publication No. 2010-228063 relates to a door, which is not a door (opening and closing door) that partitions the interior and exterior of a machine tool, but rather is a door disposed between a machining area in an interior part of a machine tool and a standby area of the tool. By changing the opening width of the door, the time required to open and close the opening and closing door is not wasted at the time of tool change, and thus, the machining time is shortened.

SUMMARY OF THE INVENTION

In the foregoing manner, in Japanese Patent No. 4629392 and Japanese Laid-Open Patent Publication No. 2010-228063, techniques are disclosed for opening a door only at a required width. However, when movement of the door is stopped, since it is necessary to gradually reduce the movement speed of the door and then stop the door, as shown in FIG. 13A, in the case that the door is opened by a necessary width (required width), the door is decelerated before the door opens at the required width, and thus the time required to open the door becomes longer. Therefore, as shown in FIG. 13B, by making the opening width of the door longer than the required width, it is possible to prevent the door from decelerating before opening the door at the required width, and the time required to open the door at the required width can be shortened. However, since the door is opened by an extra amount corresponding to the difference (extra width) between the required width and the width when the door is opened and stopped, the distance to the fully closed position of the door becomes longer. As a result, a longer time is required to close the door, and thus the opening and closing time of the door when exchanging the workpiece is prolonged.

Thus, the present invention has the object of providing a machine tool system and an opening stop position calculating device, which enable the opening and closing time of a door when exchanging a workpiece to be shortened.

A first aspect of the present invention is characterized by a machine tool system including a machine tool equipped with an openable and closable door configured to close an opening of a cover that surrounds the machine tool, and an electric motor configured to open and close the door, and a workpiece exchanging device configured to carry out exchange of a workpiece placed inside the cover. The machine tool system further includes an opening width setting unit configured to set an opening width of the door, an opening stop position calculating unit configured to calculate an opening stop position of the door at which a total time becomes minimum, wherein the total time is obtained by summing a time required to move the door from a fully closed position to a position of the set opening width, and a time required to move the door from an opening stop position at which the door is opened and stopped to the fully closed position, and a door control unit configured to control the electric motor based on the calculated opening stop position when the workpiece is exchanged by the workpiece exchanging device, and thereby control the door.

In accordance with this configuration, while preventing interference between the door and the workpiece exchanging device, it is possible to shorten the opening and closing time of the door when exchanging the workpiece. Consequently, the cycle time can be shortened.

In the first aspect of the present invention, at least one from among the opening width setting unit, the opening stop position calculating unit, and the door control unit may be provided in a controller of the machine tool.

In the first aspect of the present invention, at least one from among the opening width setting unit, the opening stop position calculating unit, and the door control unit may be provided in a controller that differs from the controller of the machine tool.

In the first aspect of the present invention, the controller that differs from the controller of the machine tool may be a controller of the workpiece exchanging device.

In the first aspect of the present invention, the workpiece exchanging device may include a gripping member configured to grip the workpiece, and a moving member configured to move the gripping member. In accordance with this feature, exchange of the workpiece can be carried out by the workpiece exchanging device.

According to the first aspect of the present invention, when the door is moved to the position of the opening width, the workpiece exchanging device may drive the moving member and the gripping member that are in a stop position, may exchange the workpiece, and thereafter, may retract the gripping member to the stop position. In addition, after having exchanged the workpiece, when the gripping member is retracted to a position at which the door, the moving member, and the gripping member do not interfere with each other even if the door is moved to the fully closed position, the door control unit may control the electric motor and thereby close the door. In accordance with this feature, interference between the door and the workpiece exchanging device can be prevented, and the cycle time can be shortened.

According to the first aspect of the present invention, the door may be moved at a predetermined movement speed, and the opening stop position calculating unit may calculate the opening stop position of the door at which the total time becomes minimum, using an acceleration from a stopped state of the door until reaching the predetermined movement speed, and a time constant from the stopped state of the door until reaching the predetermined movement speed. In accordance with this feature, in a simple manner, the opening stop position of the door at which the total time is minimum can be calculated.

In the first aspect of the present invention, the opening stop position calculating unit may calculate the opening stop position of the door at which the total time becomes minimum, using the relational expression $L_2=L+a \times T^2/8$, where $L_2$ is the opening stop position of the door, L is the opening width set by the opening width setting unit, a is the acceleration from the stopped state of the door until reaching the predetermined movement speed, and T is a time constant from the stopped state of the door until reaching the predetermined movement speed. In accordance with this feature, in a simple manner, the opening stop position of the door at which the total time is minimum can be calculated.

A second aspect of the present invention is characterized by an opening stop position calculating device, including an opening width setting unit configured to set an opening width of a door that is opened and closed by an electric motor, and an opening stop position calculating unit configured to calculate an opening stop position of the door at which a total time becomes minimum, wherein the total time is obtained by summing a time required to move the door from a fully closed position to a position of the set opening width, and a time required to move the door from an opening stop position at which the door is opened and stopped to the fully closed position.

In accordance with this configuration, while preventing interference between the door and the workpiece exchanging device, it is possible to shorten the opening and closing time of the door when exchanging the workpiece. Consequently, the cycle time can be shortened.

According to the second aspect of the present invention, the door may move at a predetermined movement speed, and the opening stop position calculating unit may calculate the opening stop position of the door at which the total time becomes minimum, using an acceleration from a stopped state of the door until reaching the predetermined movement speed, and a time constant from the stopped state of the door until reaching the predetermined movement speed. In accordance with this feature, in a simple manner, the opening stop position of the door at which the total time is minimum can be calculated.

In the second aspect of the present invention, the opening stop position calculating unit may calculate the opening stop position of the door at which the total time becomes minimum, using the relational expression $L_2=L+a \times T^2/8$, where $L_2$ is the opening stop position of the door, L is the opening width set by the opening width setting unit, a is the acceleration from the stopped state of the door until reaching the predetermined movement speed, and T is a time constant from the stopped state of the door until reaching the predetermined movement speed. In accordance with this feature, in a simple manner, the opening stop position of the door at which the total time is minimum can be calculated.

In accordance with the present invention, while preventing interference between the door and the workpiece exchanging device, it is possible to shorten the opening and closing time of the door when exchanging the workpiece. Consequently, the cycle time can be shortened.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2A is a view showing an example of a state of a door at a time that the door position lies within a door interference area;

FIG. 2B is a view showing an example of a state of the door at a time that the door position is at a door interference boundary position;

FIG. 2C is a view showing an example of a state of the door at a time that the door position lies within a door non-interference area;

FIG. 3A is a view showing an example of a state of a machine tool at a time that an operation position of the machine tool lies within a workpiece exchanging device non-interference area;

FIG. 3B is a view showing an example of a state of a machine tool at a time that the operation position of the machine tool is at a workpiece exchanging device interference boundary position;

FIG. 3C is a view showing an example of a state of a machine tool at a time that the operation position of the machine tool lies within the workpiece exchanging device interference area;

FIG. 4 is a flowchart indicating overall operations of the machine tool system (machine tool and workpiece exchanging device) shown in FIG. 1;

FIG. 10A is a diagram showing a relationship between time and the position (distance from the fully closed position) of the door;

FIG. 10B is a diagram showing a relationship between time and the speed of the door;

FIG. 12 is a diagram showing the configuration of a machine tool system according to a third modification.

DESCRIPTION OF THE PREFERRED EMBODIMENTS

Preferred embodiments of a machine tool system and an opening stop position calculating device according to the present invention will be described in detail below with reference to the accompanying drawings.

Figure 1:
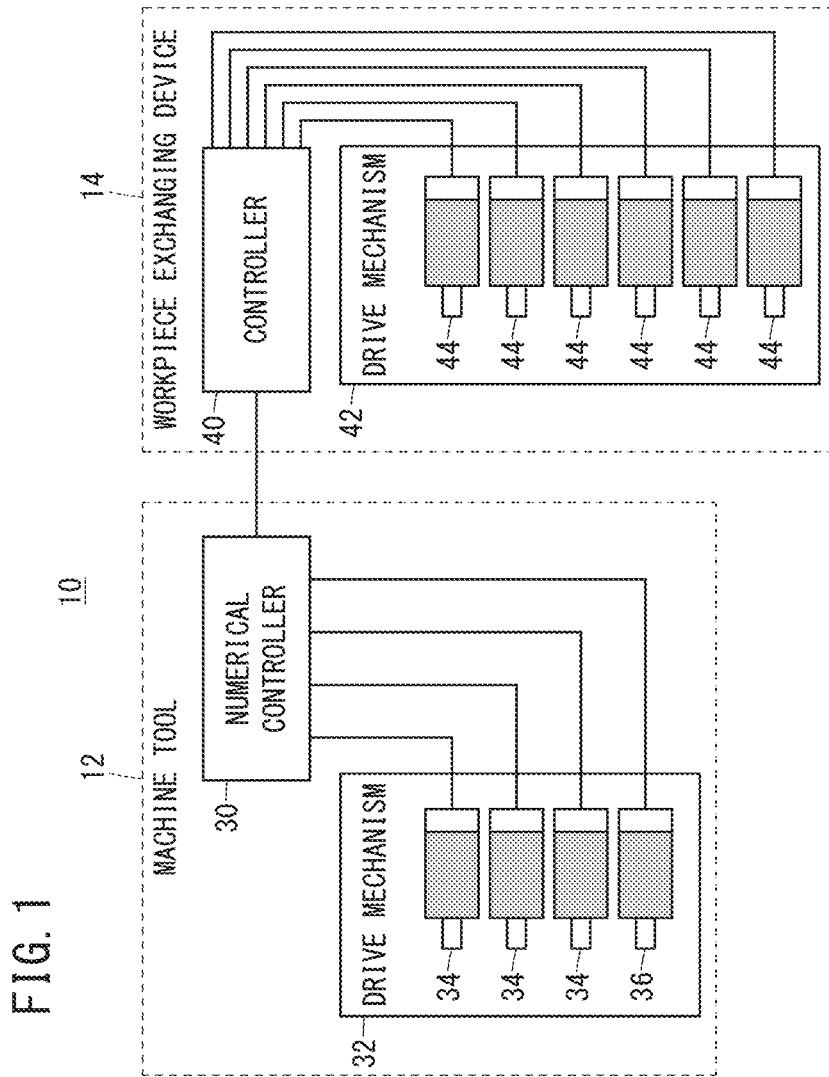
FIG. 1 is a schematic diagram showing a configuration of a machining tool system according to an embodiment of the present invention.

FIG. 1 is a diagram (functional block diagram) showing a configuration of a machine tool system 10 according to an embodiment of the present invention. The machine tool system 10 is equipped with a machine tool 12 and a workpiece exchanging device 14. The machine tool 12 is a device that preforms machining on a workpiece W (see FIGS. 3A through 3C). The machine tool 12 performs machining on the workpiece W, which is positioned on a table Ta (see FIGS. 3A through 3C). The workpiece exchanging device 14 removes the workpiece (machined workpiece) W on which machining by the machine tool 12 has been completed and places (mounts) a non-machined workpiece W on the table Ta. Stated otherwise, the workpiece exchanging device 14 exchanges and replaces the workpiece W to be machined by the machine tool 12.

As shown in FIGS. 2A through 2C, the machine tool 12 is surrounded by a cover 20 having an opening 20a, and an openable and closable door 22 is provided in the cover 20 for covering the opening 20a of the cover 20. The cover 20 is provided in order to prevent cutting fluid, which is used for machining the workpiece W, and chips (cutting waste), which are generated due to machining the workpiece W, from being scattered around the machine tool during machining of the workpiece W by the machine tool 12.

As shown in FIG. 2A, during machining, the machine tool 12 closes the door 22 in order to close the opening 20a of the cover 20. When the workpiece W is exchanged, since it is necessary for the machined workpiece W, which has been set inside the cover 20, to be taken out, and for a non-machined workpiece W to be placed inside the cover 20, as shown in FIG. 2B or FIG. 2C, the machine tool 12 opens the door 22. When the door 22 is opened to a desired opening width, the workpiece exchanging device 14 exchanges the workpiece W.

Further, as shown in FIGS. 3A through 3C, such exchange and replacement of the workpiece W is performed by an arm 24a of the workpiece exchanging device 14, and a gripping member 24b that grips the workpiece W. At a time of exchanging the workpiece W, the arm 24a is extended through the opening 20a, which is opened by the door 22, to the inside of the cover 20, whereby exchange and replacement of the workpiece W is carried out. The arm 24a serves as a moving member for moving the gripping member 24b.

In this instance, the position of the door 22 in the case that the door 22 is fully closed (the case shown in FIG. 2A), or in other words, the position of the door 22 with the opening width of the door 22 being at a minimum (0) is defined as a fully closed position. Further, the position of the door 22 in the case that the door 22 is fully opened (the case shown in FIG. 2C), or in other words, the position of the door 22 with the opening width of the door 22 being at a maximum is defined as a fully open position. In addition, the position at which the door 22 is opened and stopped is defined as an opening stop position. The opening stop position is a position that lies within a range from the fully closed position to the fully open position. Moreover, there is no case in which the opening stop position equals the fully open position, or in which the opening stop position equals the fully closed position.

Further, in the case that the workpiece exchanging device 14 is operated within a workpiece exchanging operation range, a range (area) of the position of the door 22 in which the door 22 interferes with the workpiece exchanging device 14 (or more specifically, interferes with at least one of the arm 24a and the gripping member 24b) is referred to as a door interference area (for example, refer to the condition shown in FIG. 2A). Further, even in the case that the workpiece exchanging device 14 is operated in any manner within the workpiece exchanging operation range, a range (area) of the position of the door 22 in which the door 22 does not interfere with the workpiece exchanging device 14 (or more specifically, does not interfere with the arm 24a or the gripping member 24b) is referred to as a door non-interference area (for example, refer to the condition shown in FIG. 2C). In addition, the position of the door 22 at a boundary between the door interference area and the door non-interference area is set as a door interference boundary position (the state shown in FIG. 2B). Stated otherwise, when the position of the door 22 is moved to the right (in the closing direction) from the door interference boundary position shown in FIG. 2B, the door interference area is brought about, whereas when the position of the door 22 is moved to the left (in the opening direction) from the door interference boundary position shown in FIG. 2B, the door non-interference area is brought about.

Furthermore, even in the case that the door 22 is operated (moved) in any manner within the operation range, the range (area) of the operation position of the workpiece exchanging device 14, in which the door 22 does not interfere with the workpiece exchanging device 14 (more specifically, the arm 24a and the gripping member 24b), is referred to as a workpiece exchanging device non-interference area (for example, refer to the condition shown in FIG. 3A). Moreover, the operation position of the workpiece exchanging device 14 (more specifically, the arm 24a and the gripping member 24b) shown in FIG. 3A is set as a stop position (retracted position). In the case that the door 22 is operated within the operation range, the range (area) of the operation position of the workpiece exchanging device 14, in which the door 22 interferes with the workpiece exchanging device 14 (more specifically, at least one of the arm 24a and the gripping member 24b), is referred to as a workpiece exchanging device interference area (for example, refer to the condition shown in FIG. 3C). In addition, the operation position of the workpiece exchanging device 14 at the boundary between the workpiece exchanging device interference area and the workpiece exchanging device non-interference area is set as a workpiece exchanging device interference boundary position (the state shown in FIG. 3B). Stated otherwise, operation of the workpiece exchanging device 14 from the workpiece exchanging device interference boundary position shown in FIG. 3B to the stop position becomes the workpiece exchanging device non-interference area, whereas operation of the workpiece exchanging device 14 from the workpiece exchanging device interference boundary position shown in FIG. 3B up until the workpiece W is exchanged becomes the workpiece exchanging device interference area. FIGS. 3A to 3C are side cross-sectional views of the machine tool 12 and the cover 20 shown in FIGS. 2A to 2C.

Returning to the description of FIG. 1, the machine tool 12 includes a numerical controller (controller) 30 and a drive mechanism 32. The drive mechanism 32 includes a plurality of spindle drive units 34 that drive a plurality of non-illustrated spindles of the machine tool, and a door driving unit 36 that opens and closes the door 22. The plurality of spindle drive units 34 and the door driving unit 36 are constituted by electric motors such as servomotors or the like. The numerical controller 30 performs machining on the workpiece (object to be machined) W by controlling the plurality of spindle drive units 34. Further, the numerical controller 30 carries out opening and closing of the door 22 (see FIGS. 2A to 2C) by controlling the door driving unit 36. Moreover, the numerical controller 30 drives the plurality of spindle drive units 34 and the door driving unit 36 in accordance with a machining program stored in a non-illustrated storage medium.

The workpiece exchanging device 14 includes a controller 40 and a drive mechanism 42. The drive mechanism 42 includes a plurality of drive units 44 that drive a plurality of non-illustrated drive shafts (for example, drive shafts of the arm 24a and the gripping member 24b) of the workpiece exchanging device 14. The plurality of drive units 44 are constituted by electric motors such as servomotors or the like. By controlling the plurality of drive units 44, the controller 40 moves the arm 24a and the gripping member 24b, and thereby carries out exchange and replacement of the workpiece W. Stated otherwise, the workpiece W (machined workpiece W) on which machining by the machine tool 12 has been completed is removed, and placement (mounting) of a non-machined workpiece W on the table Ta is carried out. Mutual communications can be carried out between the numerical controller 30 and the controller 40. Such communications may be carried out over wires, or may be carried out in a wireless manner. Moreover, the controller 40 drives the plurality of drive units 44 in accordance with a program stored in a non-illustrated storage medium.

Next, in accordance with the flowchart shown in FIG. 4, a description will be given of overall operations of the machine tool system 10 (the machine tool 12 and the workpiece exchanging device 14). First, in step S1, the numerical controller 30 of the machine tool 12 determines whether or not machining on the workpiece W has been completed. More specifically, the numerical controller 30 determines whether or not machining has been completed on the basis of the machining program.

When it is determined in step S1 that machining on the workpiece W has been completed, the routine proceeds to step S2, whereupon the numerical controller 30 initiates a door opening operation to open the door 22. The numerical controller 30 initiates the door opening operation by controlling the door driving unit 36. At this time, the numerical controller 30 calculates the opening stop position of the door 22, and carries out the opening operation of the door 22 so as to stop the door 22 at the calculated opening stop position. In accordance therewith, the door 22 is moved from the fully closed position to the opening stop position. The opening stop position is a position more on the side of the opening direction than the door interference boundary position, or in other words, a position within the door non-interference area. Calculations concerning the opening stop position of the door will be described later.

Next, in step S3, the numerical controller 30 determines whether or not the position of the door 22 has entered into the door non-interference area, or whether or not the position of the door 22 has arrived at the door interference boundary position. More specifically, based on a detection signal (a detection signal indicative of a movement amount of the door 22) from a non-illustrated encoder provided in the door driving unit 36, the numerical controller 30 determines whether or not the position of the door 22 has moved to the door non-interference area, or whether or not the position of the door has moved to the door interference boundary position.

The door interference boundary position is determined unambiguously based on the opening width that was set by an operator (hereinafter referred to as a user-set opening width), to be described later. At the time that the workpiece W is exchanged, in order to prevent interference between the door 22 and the workpiece exchanging device 14, it is necessary for the exchanging operation to be started by the workpiece exchanging device 14 after the door 22 has been opened to or beyond the door interference boundary position. The door interference boundary position is changed depending on the type of the workpiece W, the size of the workpiece W, or the operating space of the workpiece exchanging device 14. Further, in order to shorten the cycle time, the door 22 should not be opened any more than necessary.

Accordingly, the operator sets the user-set opening width, and then based on the user-set opening width, the door interference boundary position is determined. The user-set opening width is defined by information indicative of the distance (width) from the fully closed position of the door 22 to the door interference boundary position, and is an opening width (required width) for the door 22 that is necessary for exchanging the workpiece W. Moreover, in order to lower the risk of interference between the door 22 and the workpiece exchanging device 14 (the arm 24a and the gripping member 24b), the operator may also set the user-set opening width to be slightly longer than the actual door interference boundary position.

In step S3, if it is determined that the position of the door 22 has not entered into the door non-interference area or has not arrived at the door interference boundary position, then the routine remains at step S3 until it is determined that the position of the door 22 has entered into the door non-interference area or arrived at the door interference boundary position. In addition, in step S3, if it is determined that the position of the door 22 has entered into the door non-interference area or has arrived at the door interference boundary position, the routine proceeds to step S4, whereupon the numerical controller 30 transmits a door non-interference area signal to the controller 40 of the workpiece exchanging device 14.

Next, in step S5, the numerical controller 30 determines whether or not the door 22 has moved to the opening stop position. More specifically, based on a detection signal (a detection signal indicative of a movement amount of the door 22) from the encoder provided in the door driving unit 36, the numerical controller 30 determines whether or not the position of the door 22 has moved to the opening stop position. In step S5, the routine remains at step S5 if it is determined that the door 22 has not moved to the opening stop position, whereas if it is determined that the door 22 has moved to the opening stop position, the routine proceeds to step S6, whereupon the numerical controller 30 stops further movement of the door 22 by controlling the door driving unit 36.

In step S4, if the controller 40 of the workpiece exchanging device 14 receives the door non-interference area signal transmitted from the numerical controller 30 of the machine tool 12, then in step S7, the controller 40 initiates the exchanging operation of the workpiece W. The controller 40 initiates the exchanging operation of the workpiece W by controlling the plurality of drive units 44. By initiating the exchanging operation, the arm 24a and the gripping member 24b that are in the stop position (retracted position) (refer to the state shown in FIG. 3A) are moved toward the workpiece W that is placed inside the cover 20, and after carrying out exchange of the workpiece W, the arm 24a and the gripping member 24b are then returned (retracted) to the stop position.

Next, in step S8, the controller 40, after carrying out exchange of the workpiece W, determines whether or not the operation position of the workpiece exchanging device 14 (the arm 24a and the gripping member 24b) has entered into the workpiece exchanging device non-interference area, or whether or not the operation position thereof has arrived at the workpiece exchanging device interference boundary position. More specifically, on the basis of detection signals from non-illustrated encoders provided in the plurality of drive units 44, the controller 40 calculates the operation position of the arm 24a and the gripping member 24b. In addition, the controller 40 determines whether or not the calculated operation position of the arm 24a and the gripping member 24b has entered into the workpiece exchanging device non-interference area, or whether or not the calculated operation position thereof has arrived at the workpiece exchanging device interference boundary position. In a non-illustrated storage medium of the controller 40, position information of the workpiece exchanging device interference boundary position is stored, and the determination is made on the basis of the position information. In step S8, in the case that the determination is NO, the routine remains at step S8 until the determination becomes YES. In addition, in the case that the determination in step S8 is YES (in other words, after exchanging of the workpiece W is carried out, in the event it is determined that the operation position of the workpiece exchanging device 14 (the arm 24a and the gripping member 24b) has entered into the workpiece exchanging device non-interference area or has arrived at the workpiece exchanging device interference boundary position), the routine proceeds to step S9, whereupon the controller 40 transmits a workpiece exchanging device non-interference area signal to the numerical controller 30 of the machine tool 12.

Next, in step S10, the controller 40 determines whether or not the machine tool 12 (the arm 24a and the gripping member 24b) has moved (been operated) to the stop position. More specifically, on the basis of detection signals from the encoders provided in the plurality of drive units 44, the controller 40 determines whether or not the operation position of the arm 24a and the gripping member 24b has moved to the stop position. In step S10, if it is determined that the machine tool 12 (the arm 24a and the gripping member 24b) has not been moved (operated) to the stop position, the routine remains at step S10, whereas if it is determined that the machine tool 12 has moved to the stop position, the routine proceeds to step S11, whereupon the controller 40 stops operation of the machine tool 12 (the arm 24a and the gripping member 24b) by controlling the plurality of drive units 44.

If the numerical controller 30 of the machine tool 12 receives the workpiece exchanging device non-interference area signal, which was transmitted in step S9 from the controller 40 of the workpiece exchanging device 14, then in step S12, the numerical controller 30 of the machine tool 12 initiates a door closing operation to close the door 22. The numerical controller 30 initiates the door closing operation by controlling the door driving unit 36. Consequently, the door 22 is moved from the opening stop position to the fully closed position.

Next, in step S13, the numerical controller 30 determines whether or not the door 22 has moved to the fully closed position. More specifically, based on a detection signal (a detection signal indicative of a movement amount of the door 22) from the encoder provided in the door driving unit 36, the numerical controller 30 determines whether or not the position of the door 22 has moved to the fully closed position. In step S13, if it is determined that the door 22 has not moved to the fully closed position, the routine remains at step S13, whereas if it is determined that the door 22 has moved to the fully closed position, the routine proceeds to step S14, whereupon the numerical controller 30 stops further movement of the door 22. In addition, in step S15, the numerical controller 30 controls the plurality of spindle drive units 34, and initiates machining on a non-machined workpiece W.

In order to shorten the cycle time, it is necessary to minimize (shorten) the total time (Top+Tcl), wherein the total time (Top+Tcl) is obtained by summing a time Top required to move the door 22 by the user-set opening width (or stated otherwise, the time required to move the door 22 from the fully closed position to the door interference boundary position), and a time Tcl required to move the door 22 from the opening stop position to the fully closed position. Consequently, according to the present embodiment, an opening stop position at which the total time (Top+Tcl) becomes minimum is calculated. Stated otherwise, an opening stop position is calculated at which the opening and closing time of the door 22 during exchange of the workpiece W becomes shortened.

Figure 5:
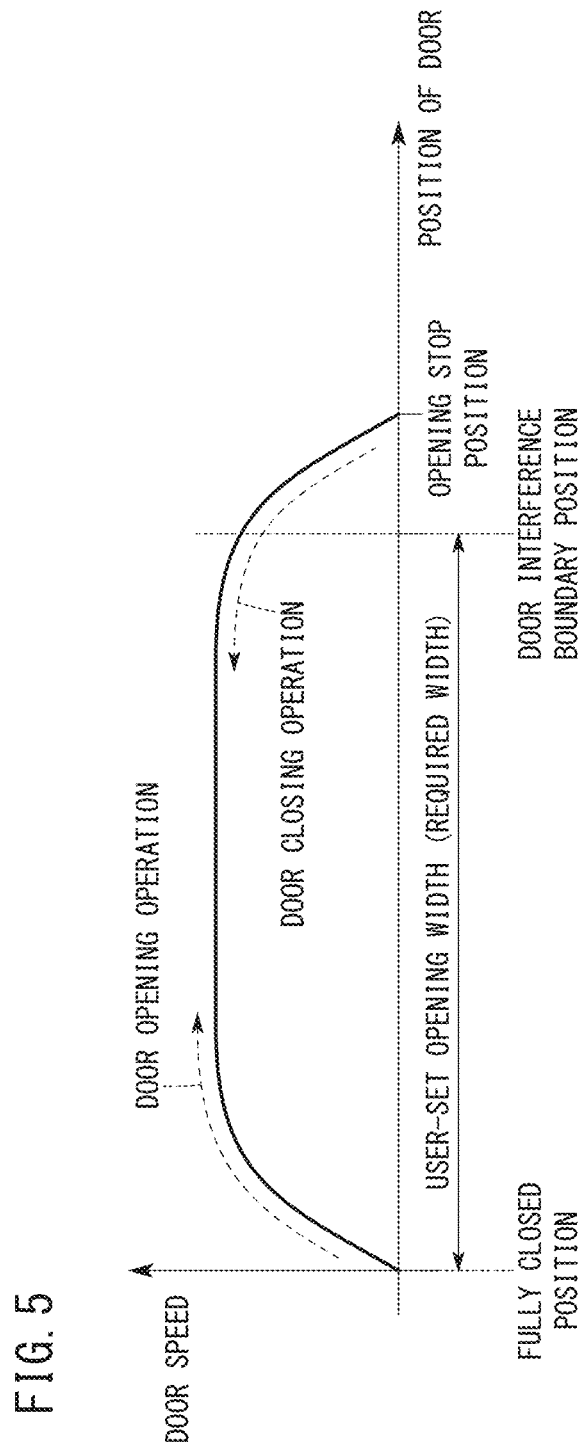
FIG. 5 is a diagram for describing a situation in which an opening and closing time of the door at a time that a workpiece is exchanged is reduced in accordance with an opening stop position.
Figure 13A:
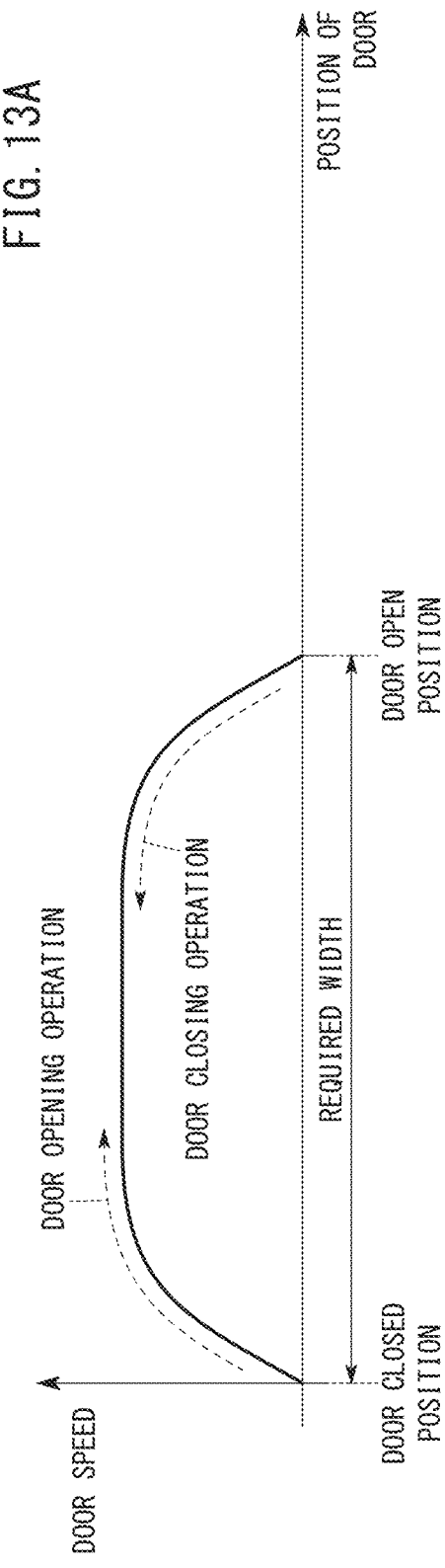
FIGS. 13A and 13B are views for describing tasks to be solved by the present invention.
Figure 13B:
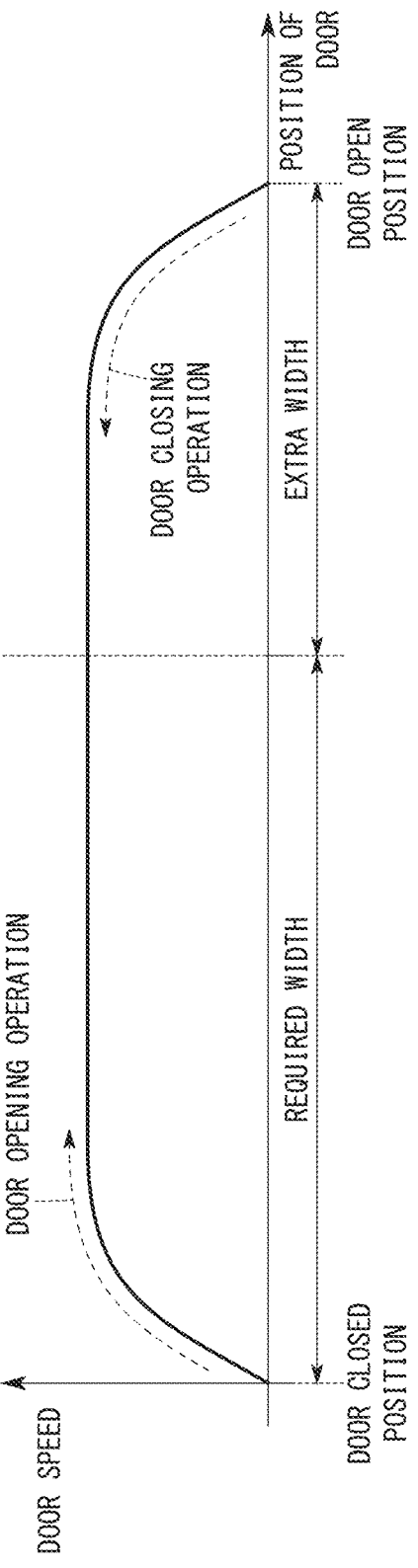

FIG. 5 is a diagram for describing a situation in which the total time (Top+Tcl) is minimized in accordance with the opening stop position. As already noted above, in the event that the door 22 is opened only by the required width (user-set opening width), because the door 22 is reduced in speed before it is opened at the user-set opening width, the opening and closing time of the door 22 when exchanging the workpiece W is prolonged (refer to FIG. 13A). Further, by making the width at which the door 22 is opened to be longer than the user-set opening width, it is possible to suppress the reduction in speed of the door 22 prior to the door 22 being opened by the user-set opening width. However, since the door 22 is opened by an extra amount corresponding to the difference (extra width) between the user-set opening width and the opening width of the door 22 at the time that the door 22 is opened and stopped, in this case, a longer time is accordingly expended in closing the door 22 to the fully closed position (see FIG. 13B). Thus, as shown in FIG. 5, by calculating the opening stop position such that the reduction in speed of the door 22 is suppressed prior to the door 22 being opened at the user-set opening width and the extra width is as short as possible, it is possible to shorten the opening and closing time of the door 22 when exchanging the workpiece W.

Figure 6:
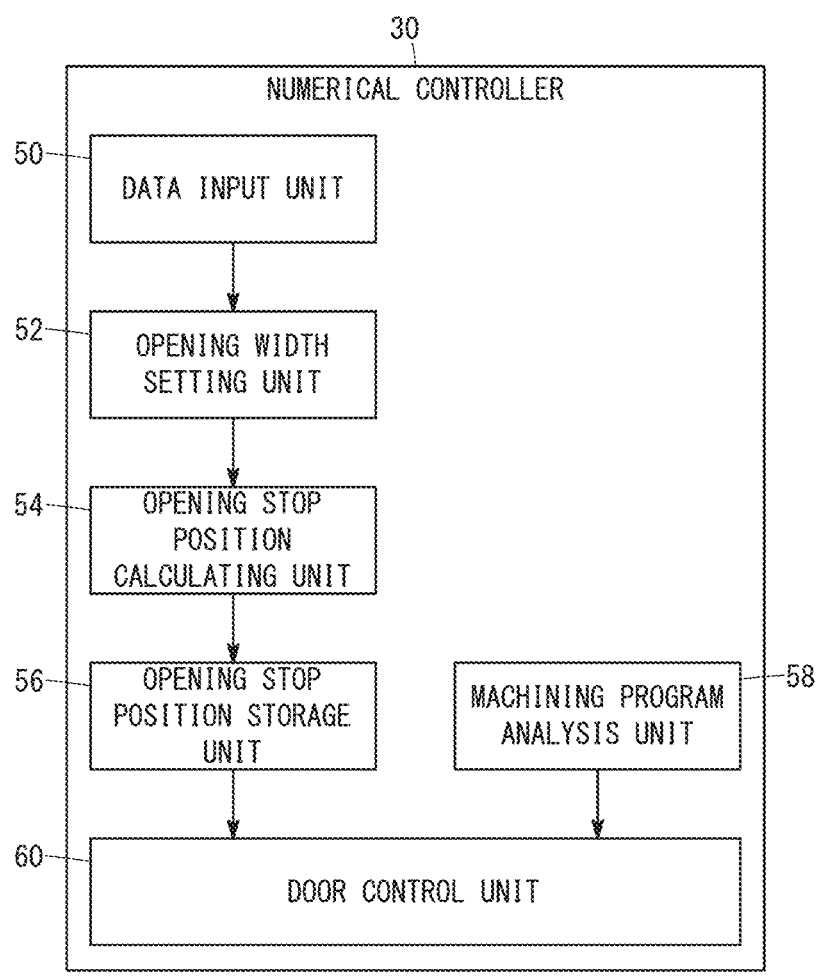
FIG. 6 is a diagram showing a configuration of a numerical controller (opening stop position calculating device), which calculates an opening stop position of a door for shortening a door opening and closing time when exchanging a workpiece, and controls a door driving unit.
Figure 7:
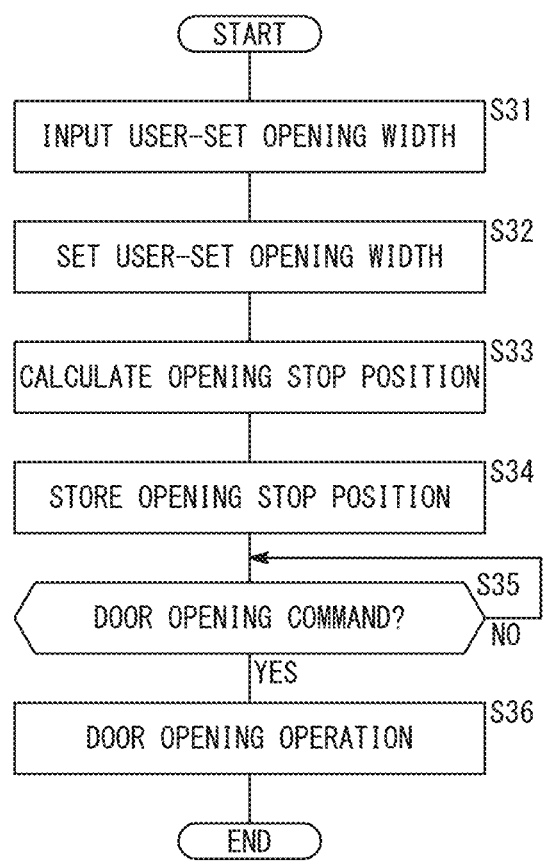
FIG. 7 is a flowchart showing operations of the numerical controller shown in FIG. 6.

FIG. 6 is a diagram (functional block diagram) showing the configuration of the numerical controller (opening stop position calculating device) 30, which calculates the opening stop position of the door 22 in order to shorten the opening and closing time of the door 22 when exchanging the workpiece W, and controls the door driving unit 36. The numerical controller 30 is equipped with a data input unit 50, an opening width setting unit 52, an opening stop position calculating unit 54, an opening stop position storage unit 56, a machining program analysis unit 58, and a door control unit 60. Further, FIG. 7 is a flowchart showing operations of the numerical controller 30. With reference to FIGS. 6 and 7, a description will be given concerning functions and operations of the configuration of the respective components of the numerical controller 30.

The data input unit 50 inputs the user-set opening width responsive to an operation of the operator (user) (step S31). The data input unit 50 is an interface for the operator to input data such as the user-set opening width, and may be a liquid crystal panel equipped with a touch panel. In this case, the operator (user) can input data by touching the display screen with a finger. Further, the data input unit 50 may also include a liquid crystal panel, a mouse, and a keyboard. In accordance with this feature, it is possible for the operator to input data by operating the mouse and the keyboard while observing the display screen of the liquid crystal panel.

The opening width setting unit 52 sets the user-set opening width that was input by the data input unit 50 (step S32). The opening width setting unit 52 stores the user-set opening width that was set in a non-illustrated storage medium provided in the opening width setting unit 52.

Figure 8:
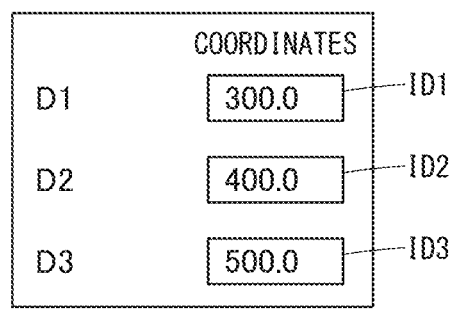
FIG. 8 is a diagram showing an input example of an opening width by the data input unit shown in FIG. 6.

FIG. 8 is a diagram showing an input example of a user-set opening width that is input by the data input unit 50. On a display screen of the data input unit 50, a plurality of input columns ID (ID1 to ID3) are displayed in which user-set opening widths can be input responsive to a plurality of door opening width command codes D (D1 to D3). Corresponding to operations of the operator (for example, touch panel operations, or operations of the keyboard, mouse, or the like), the data input unit 50 inputs the user-set opening widths into the plurality of input columns ID (ID1 to ID3) (step S31). Coordinate values may be input as the user-set opening widths, and the widths (distances) thereof may also be input. In the example shown in FIG. 8, an example is illustrated in which the value "300.0" is input in the input column ID1 corresponding to the door opening width command code D1, the value "400.0" is input in the input column ID2 corresponding to the door opening width command code D2, and the value "500.0" is input in the input column ID3 corresponding to the door opening width command code D3. In addition, after the operator has input the user-set opening widths, when a "set" button displayed on a non-illustrated screen is pressed, the opening width setting unit 52 sets the user-set opening widths that were input (step S32). At this time, the plurality of user-set opening widths, which were input in the plurality of input columns ID (ID1 to ID3), are stored in association respectively with the plurality of door opening width command codes D (D1 to D3).

The opening stop position calculating unit 54 calculates opening stop positions on the basis of the user-set opening widths, which were set (stored) in association, respectively, with each of the plurality of door opening width command codes D (D1 to D3) (step S33). The opening stop position calculating unit 54 calculates the opening stop position for each of the door opening width command codes D (D1 to D3). The manner of calculating the opening stop positions will be described in detail later.

The opening stop position storage unit 56 stores the opening stop position that was calculated by the opening stop position calculating unit 54 (step S34). At this time, the opening stop position storage unit 56 stores the plurality of opening stop positions that are associated respectively with the plurality of door opening width command codes D (D1 to D3).

Figure 9:
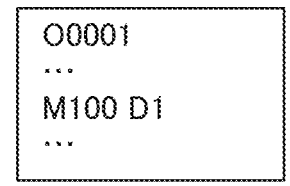
FIG. 9 is a diagram showing an example of the machining program.

The machining program analysis unit 58 is a device for reading in and analyzing the machining program. By analyzing the machining program, the machining program analysis unit 58 determines whether or not a door opening command code (for example, M100) has been detected (step S35). When the door opening command code is detected, the machining program analysis unit 58 outputs the door opening command to the door control unit 60. In the machining program, together with the door opening command code, there also is written a door opening width command code D indicative of which opening width is to be used out of the user-set opening widths that were set. Accordingly, the machining program analysis unit 58 outputs to the door control unit 60 both the door opening command and the door opening width command code D. FIG. 9 is a diagram showing an example of the machining program. As can be understood from observing FIG. 9, in the machining program, from the fact that "M100 D1" is listed therein, when "M100", which is the door opening command code, is detected, then together with the door opening command, the machining program analysis unit 58 outputs to the door control unit 60 the door opening width command code D1.

When the door opening command is transmitted from the machining program analysis unit 58 (YES in step S35), the door control unit 60 performs an operation to open the door 22 (step S36). Stated otherwise, the door control unit 60 controls the door driving unit 36 and opens the door 22. At this time, in the door control unit 60, the opening stop position, which corresponds to the door opening width command code D that was transmitted together with the door opening command from the machining program analysis unit 58, is read out from the opening stop position storage unit 56, and the door driving unit 36 is controlled based on the read out opening stop position. The door control unit 60 controls the door driving unit 36 so as to stop the door 22 at the opening stop position. Moreover, the door opening operation of step S2, the door stopping operation of steps S6 and S14, and the door closing operation of step S12 of FIG. 4 are carried out by the door control unit 60.

Next, with reference to FIGS. 10A and 10B, a description will be given concerning the method of calculating the opening stop position by the opening stop position calculating unit 54. The door 22 moves at a predetermined movement speed V, and an acceleration of the door 22 from a stopped state (i.e., a state of the speed of 0) until reaching the predetermined movement speed V (i.e., to a state of the predetermined movement speed V) will be designated by the variable a. Further, a time constant (time) from the stopped state of the door 22 until the door 22 arrives at the predetermined movement speed V will be designated by the variable T. Accordingly, the predetermined velocity V can be represented by the expression $V = a \times T$.

FIG. 10A is a diagram showing a relationship between time and the position (distance from the fully closed position $L_0$) of the door 22. In FIG. 10A, the horizontal axis represents time, and the vertical axis represents the position of the door 22. The fully closed position $L_0$ of the door 22 is set at 0, the door interference boundary position (user-set opening width) is defined by L, and the opening stop position is defined by $L_2$ (=$L+L_1$). The term $L_1$ is indicative of the distance from the door interference boundary position L to the opening stop position $L_2$, and represents an extra width. FIG. 10B is a diagram showing a relationship between time and the speed of the door 22. In FIG. 10B, the horizontal axis represents time, and the vertical axis represents the speed of the door 22.

As can be understood from observing FIGS. 10A and 10B, in the case that the door 22 is moved in the opening direction from the fully closed position $L_0$, the speed of the door 22 gradually accelerates from the stopped state (at a speed of 0) at the acceleration a, and arrives at the predetermined movement speed V (=a×T) upon elapse of the time constant T. In addition, before arriving at the opening stop position $L_2$, the speed of the door 22 is decelerated with a negative acceleration −a, and the speed of the door becomes 0 upon elapse of the time constant T, whereupon the door 22 is stopped at the opening stop position $L_2$. Further, in the case that the door 22 is moved in the closing direction from the opening stop position $L_2$, the speed of the door 22 gradually accelerates from the stopped state (at a speed of 0) at the acceleration a, and arrives at the predetermined movement speed V (=a×T) upon elapse of the time constant T. In addition, before arriving at the fully closed position $L_0$, the speed of the door 22 is decelerated with a negative acceleration −a, and the speed of the door becomes 0 upon elapse of the time constant T, whereupon the door 22 is stopped at the fully closed position $L_0$.

In this instance, the time required for the door 22 to move from the door interference boundary position L to the opening stop position $L_2$ (=L+$L_1$) is represented by $T_1$, and the time during which the door 22 moves at the predetermined movement speed V (=a×T) is represented by $T_2$. Further, the time required for the door 22 to move from the fully closed position $L_0$ to the door interference boundary position L is represented by Top, and the time required for the door 22 to move from the opening stop position $L_2$ to the fully closed position $L_0$ is represented by Tcl.

From the features described above, the time Tcl can be represented by the following equation (1), the opening stop position $L_2$ can be represented by the following equation (2), Top can be represented by the following equation (3), and $L_1$ can be represented by the following equation (4).

$$Tcl = 2 \times T + T_2 \quad (1)$$

$$L_2 = L + L_1 = (a \times T^2)/2 \times 2 + a \times T \times T_2 \quad (2)$$

$$Top = Tcl - T_1 \quad (3)$$

$$L_1 = (a \times T_1^2)/2 \quad (4)$$

From equations (1) through (4), the opening and closing time of the door 22 during exchange of the workpiece W, or in other words, the total time (Top+Tcl), which is obtained by summing the time Top required to move the door 22 from the fully closed position $L_0$ to the door interference boundary position L (user-set opening width), and the time Tcl required to move the door 22 from the opening stop position $L_2$ to the fully closed position $L_0$, can be represented by the following equation (5). It should be noted that the reason why the time $T_1$ required to move the door from the door interference boundary position L to the opening stop position $L_2$ is not included within the opening and closing time of the door 22 at the time of exchanging of the workpiece W is because, during time $T_1$, exchange and replacement of the workpiece W is carried out by the workpiece exchanging device 14. Stated otherwise, the time Top and the time Tcl are times during which only the door 22 is moved for the purpose of exchanging the workpiece W.

$$Top + Tcl = \left(2 \times T + \frac{2 \times L}{a \times T}\right) + \left(\frac{2}{a \times T}\right)\left\{\left(\sqrt{L_1} - \sqrt{\frac{a \times T^2}{8}}\right)^2 - \frac{a \times T^2}{8}\right\} \quad (5)$$

In equation (5), aside from the term $L_1$, all of the other terms are constants, and therefore, when $L_1$ is defined by the expression $L_1 = a \times T^2/8$, the total time (Top+Tcl) becomes the minimum value thereof. Consequently, the opening stop position calculating unit 54 calculates the opening stop position $L_2$ on the basis of the user-set opening width L that was set by the opening width setting unit 52, and $a \times T^2/8$ (=$L_1$). Stated otherwise, the opening stop position calculating unit 54 calculates the opening stop position $L_2$, using the relational expression $L_2 = L + a \times T^2/8$. In addition, by the door control unit 60 controlling the door driving unit 36 so that the door 22 stops at the opening stop position $L_2$ (=L+a× $T^2/8$) which was calculated by the opening stop position calculating unit 54, the opening and closing time of the door 22 at the time that the workpiece W is exchanged can be made as short as possible. Incidentally, the door control unit 60 does not necessarily control the door driving unit 36 so as to stop the door 22 at the calculated opening stop position $L_2$. Stated otherwise, the door control unit 60 may control the door driving unit 36 so as to stop the door 22 at a position shifted slightly from the calculated opening stop position $L_2$. However, if the position at which the door 22 is stopped is shifted significantly from the opening stop position $L_2$, the total time (Top+Tcl) becomes large (prolonged). Therefore, it is preferable that the door 22 should be stopped at a position in which the total time (Top+Tcl) lies within a range of ±a few % with respect to the minimum total time (Top+Tcl).

[Modifications of the Embodiment Described Above]

The above-described embodiment may be modified in the following ways.

Figure 11:
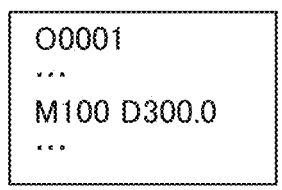
FIG. 11 is a diagram showing an example of a machining program according to a first modification.

(Modification 1) According to a first modification, the opening width setting unit 52 incorporates the user-set opening width L, which is input by the data input unit 50, into the machining program. FIG. 11 is a diagram showing an example of a machining program in which the user-set opening width L is incorporated. As shown in FIG. 11, in the machining program, together with the door opening command code "M100", there is also written along therewith the door opening width command code "D300.0". The portion "300.0" of the door opening width command code is the user-set opening width L that was set by the opening width setting unit 52. In addition, when the door opening command code "M100" is detected, together with outputting the door opening command to the door control unit 60, the machining program analysis unit 58 also outputs the detected user-set opening width L to the opening stop position calculating unit 54. On the basis of the user-set opening width L output thereto, the opening stop position calculating unit 54 calculates the opening stop position $L_2$, and outputs the calculated opening stop position $L_2$ to the door control unit 60. Thus, when the door opening command is transmitted from the machining program analysis unit 58, and the opening stop position $L_2$ is transmitted from the opening stop position calculating unit 54, the door control unit 60 controls the door driving unit 36 on the basis of the opening stop position $L_2$. Consequently, according to the first modification, there is no need for the opening stop position storage unit 56.

(Modification 2) According to the above-described embodiment and the first modification, the numerical controller 30 controls the door driving unit 36. However, the controller 40 of the workpiece exchanging device 14 may also control the door driving unit 36. In this case, the determination of whether or not the position of the door 22 has entered into the door non-interference area or has arrived at the door interference boundary position (the operation of step S3) may also be carried out by the controller 40. Further, the determination of whether or not the operation position of the workpiece exchanging device 14 has entered into the workpiece exchanging device non-interference area, or whether the operation position thereof has arrived at the workpiece exchanging device interference boundary position (the operation of step S8) may also be performed by the numerical controller 30. In this case, together with the workpiece exchanging device 14 outputting the operation information of the workpiece exchanging device 14 to the numerical controller 30, the position information of the workpiece exchanging device interference boundary position also is stored in a non-illustrated storage medium of the numerical controller 30.

(Modification 3) According to the above-described embodiment and the first modification, the numerical controller 30 controls the door driving unit 36. However, as shown in FIG. 12, the door driving unit 36 may also be controlled by a centralized controller 70. Such a centralized controller 70 is a higher-level controller that supervises control of both the numerical controller 30 and the controller 40. In this case, the determination of whether or not the position of the door 22 has entered into the door non-interference area or has arrived at the door interference boundary position (the operation of step S3) may also be carried out by the centralized controller 70. Further, the determination of whether or not the operation position of the workpiece exchanging device 14 has entered into the workpiece exchanging device non-interference area, or whether the operation position thereof has arrived at the workpiece exchanging device interference boundary position (the operation of step S8) may also be performed by the centralized controller 70. In this case, together with the workpiece exchanging device 14 outputting the operation information of the workpiece exchanging device 14 to the centralized controller 70, the position information of the workpiece exchanging device interference boundary position also is stored in a non-illustrated storage medium of the centralized controller 70. The centralized controller 70 may also control numerical controllers 30 of a plurality of machine tools 12, as well as controllers 40 of a plurality of workpiece exchanging devices 14. In other words, as shown in FIG. 12, the centralized controller 70 may collectively control a plurality of production facilities 72, each of which includes a machine tool 12 and a workpiece exchanging device 14.

(Modification 4) Among the data input unit 50, the opening width setting unit 52, the opening stop position calculating unit 54, the opening stop position storage unit 56, the machining program analysis unit 58, and the door control unit 60, at least one thereof may be provided in a controller apart from the numerical controller 30 (for example, the centralized controller 70 or the controller 40 of the workpiece exchanging device 14).

(Modification 5) Although the above described embodiment and the first through fourth modifications have been described by way of example with a robot serving as the workpiece exchanging device 14, a loader may also serve as the workpiece exchanging device 14. The loader also includes a gripping member that grips the workpiece W, and a moving member that moves the gripping member.

As has been described above, the machine tool system 10, which has been described in the form of at least one of the above-described embodiment and the first through fifth modifications thereof, is equipped with the machine tool 12, which comprises the openable and closable door 22 for closing the opening 20a of the cover 20 that surrounds the machine tool 12, and the door driving unit 36 for opening and closing the door 22, as well as the workpiece exchanging device 14 that carries out exchange of the workpiece W arranged inside the cover 20. In addition, the machine tool system 10 is further equipped with the opening width setting unit 52 for setting the user-set opening width L of the door 22, the opening stop position calculating unit 54 for calculating an opening stop position $L_2$ of the door 22 at which a total time (Top+Tcl), which is obtained by summing the time Top required to move the door 22 from the fully closed position $L_0$ to the position of the user-set opening width L, and the time Tcl required to move the door 22 from the opening stop position $L_2$ at which the door 22 is opened and stopped to the fully closed position $L_0$, is minimized, and the door control unit 60 for controlling the door driving unit 36 based on the calculated opening stop position $L_2$ when the workpiece W is exchanged by the workpiece exchanging device 14, and thereby controlling the door 22.

In accordance with this configuration, while preventing interference between the door 22 and the workpiece exchanging device 14, it is possible to shorten the opening and closing time of the door 22 when exchanging the workpiece W. Consequently, the cycle time can be shortened.

At least one from among the opening width setting unit 52, the opening stop position calculating unit 54, and the door control unit 60 may be provided in the numerical controller 30 of the machine tool 12. Further, at least one from among the opening width setting unit 52, the opening stop position calculating unit 54, and the door control unit 60 may be provided in a controller that differs from the numerical controller 30 of the machine tool 12. The controller that differs from the controller 30 of the machine tool 12 may be the controller 40 of the workpiece exchanging device 14, or may be the centralized controller 70.

The workpiece exchanging device 14 includes a gripping member (for example, the gripping member 24b) that grips the workpiece W, and a moving member (for example, the arm 24a or the like) that moves the gripping member. Consequently, exchange of the workpiece W can be carried out by the workpiece exchanging device 14.

When the door 22 is moved to the position of the user-set opening width L, the workpiece exchanging device 14 drives the moving member and the gripping member that are in the stop position, and carries out exchange of the workpiece W, and thereafter, retracts the gripping member to the stop position. After having exchanged the workpiece W, the gripping member is retracted to a position at which the door 22, the moving member, and the gripping member do not interfere with each other even if the door 22 is moved to the fully closed position, and then the door control unit 60 controls the door driving unit 36 and thereby closes the door 22. In accordance with this feature, interference between the door 22 and the workpiece exchanging device 14 can be prevented, and the cycle time can be shortened.

The door 22 moves at a predetermined movement speed V, and the opening stop position calculating unit 54 calculates the opening stop position $L_2$ of the door 22 at which the total time (Top+Tcl) becomes minimum, using an acceleration a from a stopped state of the door 22 until the door 22 reaches the predetermined movement speed V, and a time constant T from the stopped state of the door 22 until the door 22 reaches the predetermined movement speed V. Consequently, in a simple manner, the opening stop position $L_2$ of the door 22 at which the total time (Top+Tcl) is minimum can be calculated. More specifically, using the relational expression $L_2=L+a\times T^2/8$, the opening stop position calculating unit 54 calculates the opening stop position $L_2$ of the door 22 at which the total time (Top+Tcl) becomes minimum.

While the invention has been particularly shown and described with reference to a preferred embodiment, it will be understood that variations and modifications can be effected thereto by those skilled in the art without departing from the scope of the invention as defined by the appended claims.

What is claimed is:

1. A machine tool system comprising:
   a machine tool equipped with an openable and closable door configured to close an opening of a cover that surrounds the machine tool, and an electric motor configured to open and close the door; and
   a workpiece exchanging device configured to carry out exchange of a workpiece placed inside the cover;
   the machine tool system further comprising:
   an opening width setting unit configured to set an opening width of the door that is necessary for exchanging the workpiece;
   an opening stop position calculating unit configured to calculate an opening stop position of the door at which a total time becomes minimum, wherein the total time is obtained by summing a time required to move the door from a fully closed position to a position of the set opening width, and a time required to move the door from an opening stop position at which the door is opened more than the opening width and stopped to the fully closed position; and
   a door control unit configured to control the electric motor based on the calculated opening stop position when the workpiece is exchanged by the workpiece exchanging device, and thereby move the door from the fully closed position to the opening stop position,
   wherein the door control unit controls the electric motor to initiate a door opening operation or a door closing operation, wherein,
   during the door opening operation, the door is moved from the fully closed position to the calculated opening stop position, and
   during the door closing operation, the door is moved from calculated opening stop position to the fully closed position.

2. The machine tool system according to claim 1, wherein at least one from among the opening width setting unit, the opening stop position calculating unit, and the door control unit is provided in a controller of the machine tool.

3. The machine tool system according to claim 1, wherein at least one from among the opening width setting unit, the opening stop position calculating unit, and the door control unit is provided in a controller that differs from a controller of the machine tool.

4. The machine tool system according to claim 3, wherein the controller that differs from the controller of the machine tool is a controller of the workpiece exchanging device.

5. The machine tool system according to claim 1, wherein the workpiece exchanging device includes a gripping member configured to grip the workpiece, and a moving member configured to move the gripping member.

6. The machine tool system according to claim 5, wherein:
   when the door is moved to the position of the opening width, the workpiece exchanging device drives the moving member and the gripping member that are in a stop position, performs exchanging of the workpiece, and thereafter, retracts the gripping member to the stop position; and
   after having exchanged the workpiece, when the gripping member is retracted to a position at which the door, the moving member, and the gripping member do not interfere with each other even if the door is moved to the fully closed position, the door control unit controls the electric motor and closes the door.

7. The machine tool system according to claim 1, wherein:
   the door moves at a predetermined movement speed; and
   the opening stop position calculating unit calculates the opening stop position of the door at which the total time becomes minimum, using an acceleration from a stopped state of the door until reaching the predetermined movement speed, and a time constant from the stopped state of the door until reaching the predetermined movement speed.

8. The machine tool system according to claim 7, wherein the opening stop position calculating unit calculates the opening stop position of the door at which the total time becomes minimum, using a relational expression $L_2=L+a\times T^2/8$, where $L_2$ is the opening stop position of the door, L is the opening width set by the opening width setting unit, a is the acceleration from the stopped state of the door until reaching the predetermined movement speed, and T is the time constant from the stopped state of the door until reaching the predetermined movement speed.

9. An opening stop position calculating device of a machine tool system, comprising:
   an opening width setting unit configured to set an opening width of a door that is opened and closed by an electric motor and is necessary for exchanging a workpiece; and
   an opening stop position calculating unit configured to calculate an opening stop position of the door at which a total time becomes minimum, wherein the total time is obtained by summing a time required to move the door from a fully closed position to a position of the set opening width, and a time required to move the door from an opening stop position at which the door is opened more than the opening width and stopped to the fully closed position,
   wherein, the door is moved from the fully closed position to the calculated opening stop position during the door opening operation by a door control unit, and
   the door is moved from calculated opening stop position to the fully closed position by the door control unit during the door closing operation.

10. The opening stop position calculating device according to claim 9, wherein:
    the door moves at a predetermined movement speed; and
    the opening stop position calculating unit calculates the opening stop position of the door at which the total time becomes minimum, using an acceleration from a stopped state of the door until reaching the predetermined movement speed, and a time constant from the stopped state of the door until reaching the predetermined movement speed.

11. The opening stop position calculating device according to claim 10, wherein the opening stop position calculating unit calculates the opening stop position of the door at which the total time becomes minimum, using a relational expression $L_2 = L + a \times T^2/8$, where $L_2$ is the opening stop position of the door, L is the opening width set by the opening width setting unit, a is the acceleration from the stopped state of the door until reaching the predetermined movement speed, and T is the time constant from the stopped state of the door until reaching the predetermined movement speed.

\* \* \* \* \*